US010131384B2

(12) United States Patent
Raines et al.

(10) Patent No.: US 10,131,384 B2
(45) Date of Patent: Nov. 20, 2018

(54) TRUCK BED EXTENDER WITH WEBBING (71) Applicant: FORD GLOBAL TECHNOLOGIES, LLC, Dearborn, MI (US)

(72) Inventors: Travis Justin Raines, Grosse Ile, MI (US); Pattrick Loew, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 21 days.

(21) Appl. No.: 15/275,696

(22) Filed: Sep. 26, 2016

(65) Prior Publication Data
US 2018/0086391 A1   Mar. 29, 2018

(51) Int. Cl.
B62D 33/027 (2006.01)
B60P 3/40 (2006.01)
B60R 3/02 (2006.01)
B62D 33/03 (2006.01)
B60P 7/08 (2006.01)
B62D 33/08 (2006.01)
B60R 3/00 (2006.01)
B60R 5/04 (2006.01)

(52) U.S. Cl.
CPC ............ B62D 33/0273 (2013.01); B60P 3/40 (2013.01); B60P 7/0876 (2013.01); B60R 3/00 (2013.01); B60R 3/02 (2013.01); B60R 5/041 (2013.01); B62D 33/03 (2013.01); B62D 33/08 (2013.01)

(58) Field of Classification Search
CPC .... B62D 33/0273; B62D 33/03; B62D 33/08; B60R 3/02; B60R 3/00; B60R 5/041; B60P 3/40; B60P 7/0876
See application file for complete search history.

(56) References Cited

U.S. PATENT DOCUMENTS

| | | |
|---|---|---|
| 5,028,063 A | 7/1991 | Andrews |
| 6,918,624 B2 | 7/2005 | Miller et al. |
| 6,966,595 B2 | 11/2005 | Bruford et al. |
| 7,090,276 B1 | 8/2006 | Bruford et al. |
| 7,234,749 B1 | 6/2007 | Firzlaff et al. |
| 7,267,387 B1 | 9/2007 | Bruford et al. |
| 7,347,473 B2 | 3/2008 | Miller et al. |
| 7,488,021 B1 | 2/2009 | Roos et al. |
| 8,657,542 B2 | 2/2014 | Liu et al. |
| 8,950,989 B1 | 2/2015 | Rivera |
| 9,302,719 B1 | 4/2016 | Krishnan et al. |
| 2006/0186685 A1* | 8/2006 | Nagle .................. B60P 3/40 296/26.11 |

(Continued)

Primary Examiner — D Glenn Dayoan
Assistant Examiner — Melissa A Black
(74) Attorney, Agent, or Firm — Jason Rogers; King & Schickli, PLLC (57) ABSTRACT An apparatus is for extending a vehicle bed. A tailgate is provided for lowering to provide a tailgate opening for providing access to the vehicle bed. The tailgate includes a retractable member adapted for extending vertically from the tailgate when lowered. A retractable webbing is provided for associating with the retractable member and adapted for moving to a deployed position to at least partially span the tailgate opening in a lowered condition. A ladder for use in climbing into the vehicle bed may form the retractable member, or may be provided in addition to it. Plural webbings may also be provided for spanning multiple retractable members associated with the tailgate.

20 Claims, 8 Drawing Sheets (56) References Cited

U.S. PATENT DOCUMENTS

2008/0136208 A1 6/2008 Kuznarik et al.
2009/0021035 A1 1/2009 Cheung et al.
2015/0336622 A1 11/2015 Worden et al.

\* cited by examiner

TRUCK BED EXTENDER WITH WEBBING

TECHNICAL FIELD

This document relates generally to the motor vehicle field and, more particularly, to a truck bed extender that may be formed by a retractable tailgate step and handles for use when climbing into the truck bed using the step when deployed, and which may include a webbing for aiding in the retention of cargo, and which may also be selectively deployed and retracted for stowage in a spooled configuration when not in use.

BACKGROUND

For various reasons, it may be desirable to extend the effective length of a truck bed, such as for hauling a particularly long piece of cargo that would not fit in the bed with the tailgate in the raised position. In some cases, this is done by lowering the tailgate and placing a separate cage-like structure comprised of stacked, curved bars on it to help contain the cargo within the resulting extension created by the lowered tailgate. While effective, this arrangement requires using a large, separate component for placement on the lowered tailgate, which must be stored apart from the truck when not in use.

Thus, a need is identified for a bed extender that can be easily stowed when not in use, and capable of being readily deployed for extending the effective length of the bed in a sturdy and reliable manner.

SUMMARY

In accordance with the purposes and benefits described herein, an apparatus for extending a vehicle bed includes a tailgate for lowering to provide a tailgate opening for providing access to the vehicle bed. The tailgate includes a retractable member adapted for extending vertically from the tailgate when lowered. A retractable webbing is provided for associating with the retractable member and adapted for moving to a deployed position to at least partially span the tailgate opening in a lowered condition.

In one embodiment, the retractable webbing in the deployed position comprises a first webbing adapted for spanning between a wall forming a portion of the vehicle bed and the retractable member. The tailgate may further comprise first and second retractable members for extending vertically from the tailgate when lowered, and the retractable webbing may extend between the first and second retractable members, such as when oriented vertically from the tailgate. Alternatively, the retractable webbing comprises a first webbing spanning between a first wall forming a portion of the vehicle bed and the first retractable member, and further including a second retractable webbing spanning between the first and second retractable members. A third retractable webbing may also be provided for spanning from the second retractable member to a second wall forming another portion of the vehicle bed.

A housing supported by the retractable member or a wall of the vehicle (including possibly recessed in a panel) may receive the retractable webbing in a spooled configuration. The retractable webbing may include a connector adapted for connecting with the retractable member, and may be partially within the retractable member. The retractable member may comprise a ladder supported by the tailgate and adapted for moving from a lowered position for use in stepping into the vehicle bed to a raised position. Alternatively, the ladder may be provided in addition to the retractable member, which may serve as a handle for use in climbing the ladder when deployed.

A further aspect of the disclosure pertains to an apparatus for extending a vehicle bed. The apparatus comprises a tailgate adapted for lowering relative to the vehicle bed to provide a tailgate opening. The tailgate includes a first member adapted for extending vertically from the tailgate when lowered. A first webbing extendable from a housing is adapted for spanning a first wall forming a portion of the vehicle bed and the first member.

In one embodiment, a second member is provided for extending vertically from the tailgate when lowered, and a second webbing for spanning between the first and second members. A third webbing may be associated with the second member and is provided for extending to a second wall forming another portion of the vehicle bed. A ladder may also be supported by the tailgate and adapted for moving from a lowered position for use in stepping into the vehicle bed to a raised position for connecting with the first member when oriented vertically from the tailgate.

Yet another aspect of the disclosure pertains to an apparatus for extending a vehicle bed. The apparatus comprises a tailgate for lowering relative to the vehicle bed to form a tailgate opening. A ladder is supported by the tailgate and adapted for moving to a lowered position for use in stepping into the vehicle bed. A retractable handle is provided, and includes a stowed position and a deployed position for use in climbing the ladder in the lowered position. A webbing is also provided for associating with the retractable handle in the deployed position to at least partially span the tailgate opening. A housing may also be provided for receiving at least a portion of the webbing in a spooled configuration.

In the following description, there are shown and described several preferred embodiments of the truck bed extender with a webbing. As it should be realized, the arrangement is capable of other, different embodiments and its several details are capable of modification in various, obvious aspects all without departing from the truck bed extender with a webbing as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the truck bed extender with a webbing and together with the description serve to explain certain principles thereof. In the drawing figures.

Reference will now be made in detail to the present preferred embodiments of the truck bed extender with a webbing, examples of which are illustrated in the accompanying drawing figures.

DETAILED DESCRIPTION

Figure 1:
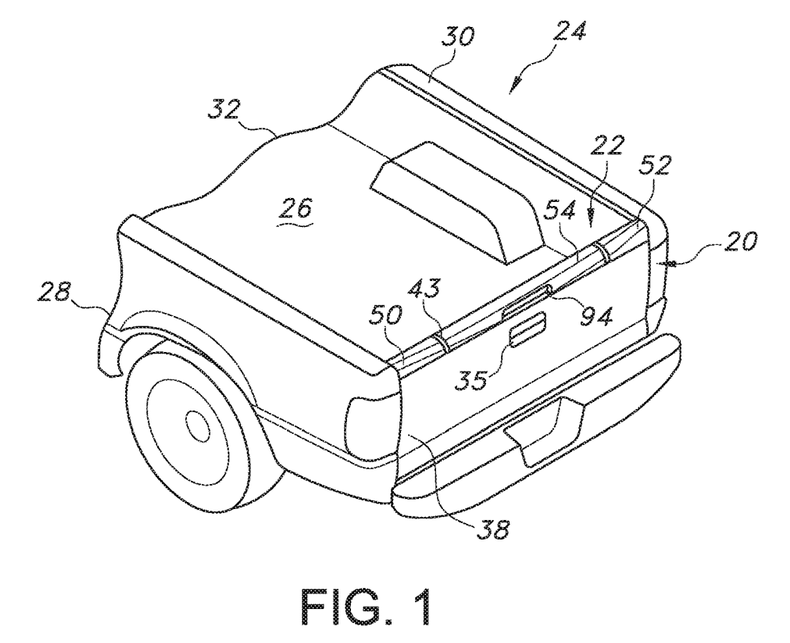
FIG. 1 is a partially cutaway, rear perspective view of a vehicle bed including a tailgate with a ladder in a retracted position.

Reference is now made to FIG. 1, which illustrates a tailgate 20 including a retractable ladder 22. The tailgate 20 is adapted to mount to a vehicle 24, such as a pickup truck. The vehicle 24 includes a storage compartment or bed 26 that is defined by a left rear quarter panel 28, which forms a first vertical surface of the bed 26; a right rear quarter panel 30, which forms a second vertical surface of the bed 26; a floor 32, which extends between the two panels 28, 30; and the tailgate 20.

Figure 3:
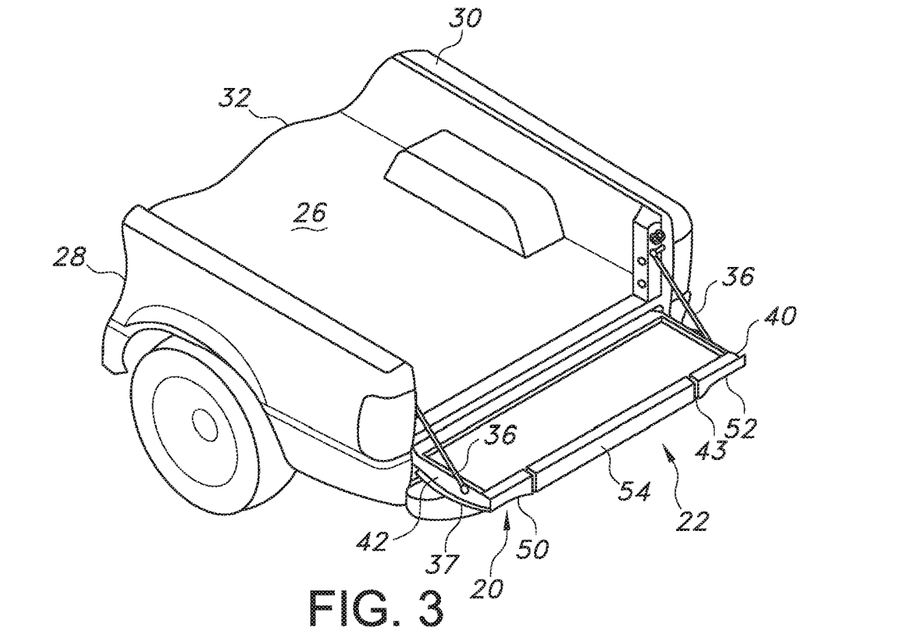
FIG. 3 is a similar view with the tailgate in the lowered position, ready for loading the bed with cargo.

As can be understood by comparing FIGS. 1 and 3, the tailgate 20 is pivotable between a generally vertical closed position and a generally horizontal open position to open and close the bed 26, and thus form a tailgate opening in the former position. In this regard, and as perhaps best shown in FIG. 9, the tailgate 20 includes a pair of tailgate hinges 34 that cooperate with the side panels 28, 30. A pair of tailgate supports 36 connected to these panels 28, 30 support the tailgate 20 when in the lowered or horizontal position. A tailgate handle 35 mounts to an outer panel 38, and functions in a conventional manner. The release mechanism for the tailgate 20, as well as tailgate latches, are conventional and well known in the art and so are not shown in detail.

The tailgate 20 includes a tailgate frame 37, which forms the outer finished surface of the tailgate 20, and an inner panel 40, which mounts to the outer panel 38 and forms the inner surface and sides 42 of the tailgate 20. The outer panel 38 and inner panel 40 combine to form a channel 68. Other tailgate reinforcement members (not shown) and brackets (not shown) may be mounted within the frame 37 to provide structural support to the frame outer and inner panels 38, 40.

A left tailgate molding 50 and a right tailgate molding 52 may form the upper surfaces of the tailgate 20. These moldings 50, 52 help to prevent paint scratches on metal parts when cargo is being loaded over the top of a closed tailgate 20. The moldings 50, 52 may be made of colored plastic that is the desired color of the parts, which eliminates the need to paint them.

Figure 2:
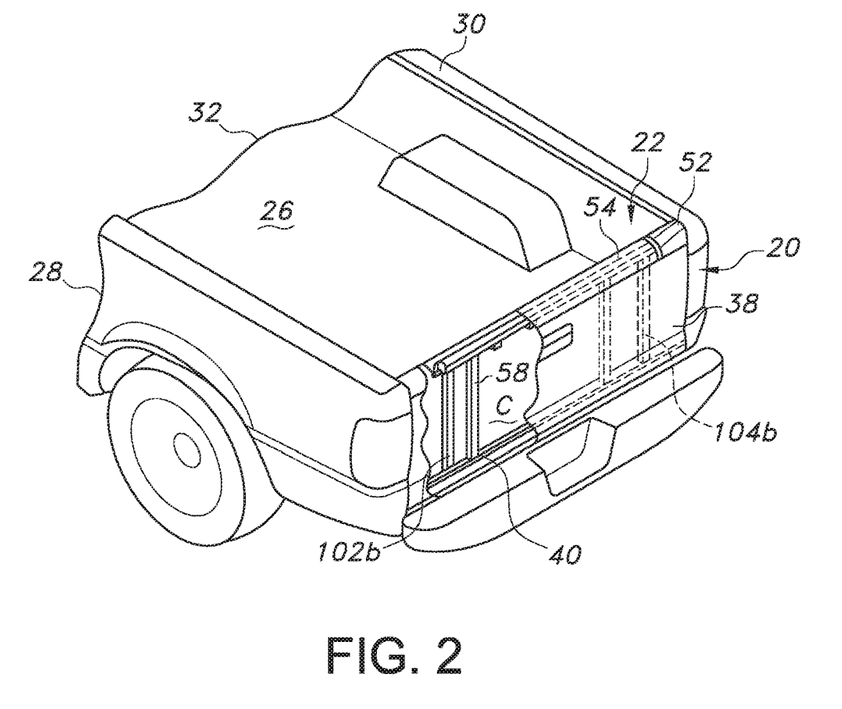
FIG. 2 is a similar view, with a cutaway illustrating an interior portion of the tailgate to show certain of the structures forming the ladder.
Figure 5:
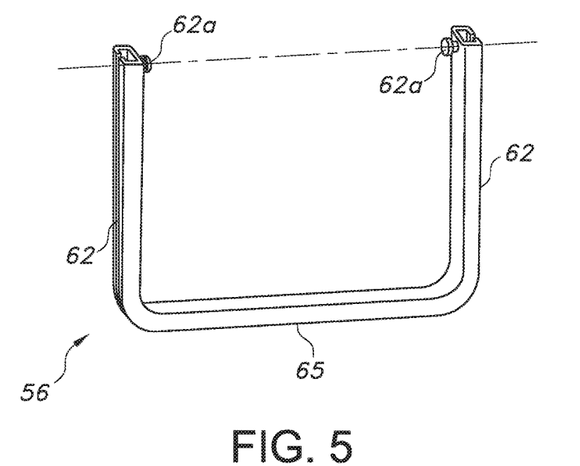
FIG. 5 is a perspective view of a frame forming part of the retractable ladder according to one possible embodiment.
Figure 6:
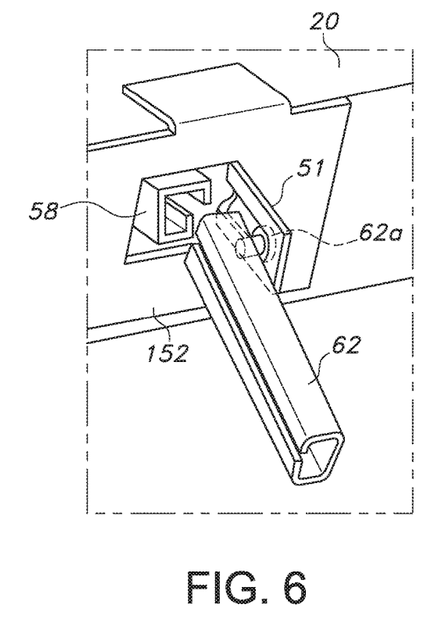
FIG. 6 is a cutaway perspective view illustrating one possible mechanism for allowing pivoting of the ladder between a lowered and a raised position.
Figure 7:
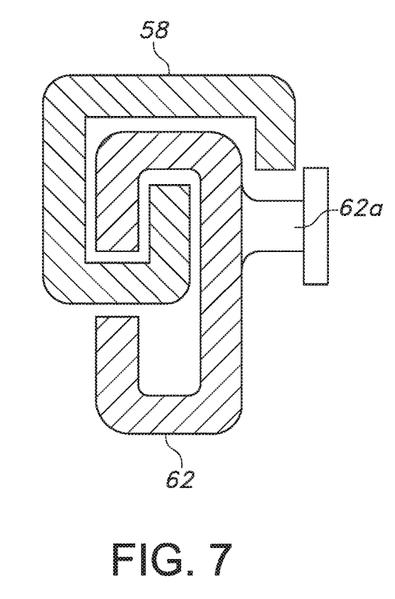
FIG. 7 is a cross-sectional view of the retractable support and associated receiver for the ladder.

The components that make up the tailgate frame 37 are formed so that a hollow internal cavity C is created, as indicated by the partially cutaway view provided in FIG. 2. Within this cavity C, the ladder 22 is retained in the retracted configuration. In one embodiment, as shown in FIGS. 5-7, the ladder 22 includes a transverse portion 54 (which together with moldings 50, 52 form the upper end surface of the tailgate 20), a movable frame portion 56, and guide rails 58. As can be understood with reference to FIG. 6, the 58 may be hollow, generally rectangular tubes fixed to the tailgate frame 37 and support the movable frame portion 56 as it is telescopically extended from and retracted into the guide rails 58, which may be fastened to the inner panel 40 in order to help secure the guide rails to the tailgate 20.

With continued reference to FIGS. 5 and 6, the movable frame portion 56 includes a pair of supports 62 that may retracted into and extend from the respective guide rail 58. Each support 62 is received telescopically in a respective one of the guide rails 58. The supports 62 may be separate structures connected to the transverse portion 54, or may include a cross member 65 that connects them to form a generally U-shaped structure, as shown in FIG. 5. Each support 62 also includes a pivot pin 62a, which may interface with a pivot bracket 51 connected to the tailgate 20.

To deploy the ladder 22 from its stowed position, one grasps the transverse portion 54. One then pulls on the transverse portion 54 to telescopically slide the supports 62 relative to the guide rails 58. Once the movable frame portion 56 slides out to a predetermined extended position relative to the tailgate 20 to engage the pin 62a with bracket 51, it can pivot downward until the supports 62 engage stops 152. The size and location of the stops 152 determines the downward angle at which the supports 62 engage the structural stops 152. This angle can be any angle that is deemed most convenient for positioning of an assist step.

After the frame portion 56 is in this downward extending, generally vertical orientation, one may use a hand or foot to pivot a flip step 153 connected to the transverse portion 54 by a hinge 159 from its closed position resting against the support 62 to its open position generally flush and coplanar with the support and extending toward the vehicle 24. The ladder 22 is now in its step assist position (as best seen in FIG. 4).

Figure 4:
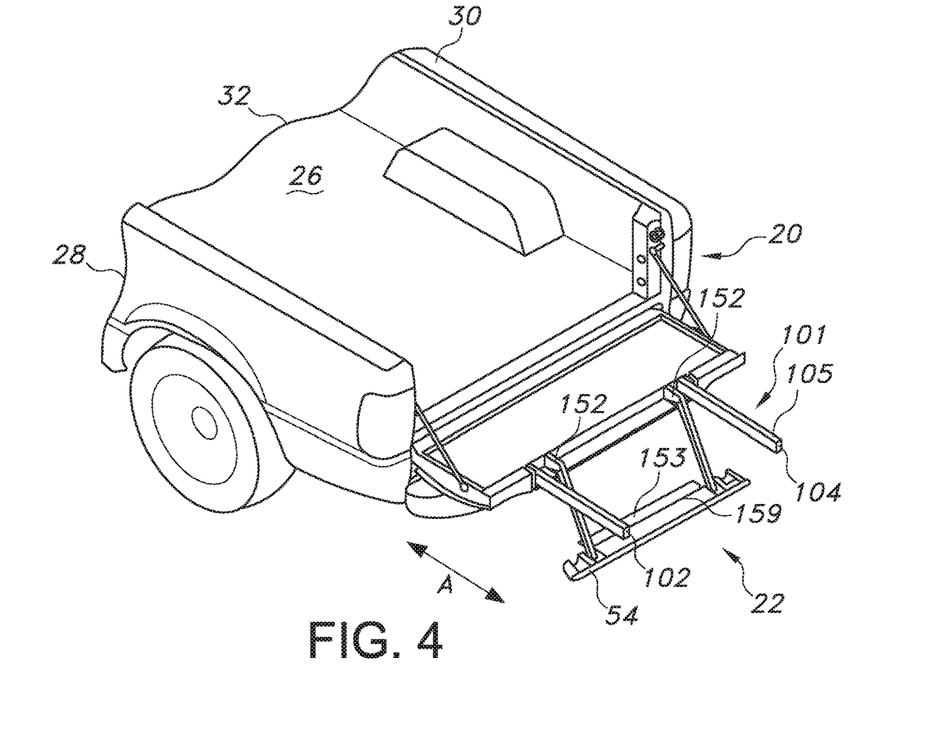
FIG. 4 is a similar view showing a railing formed by extendable rails and a retractable ladder in a lowered position, ready for use in stepping into the bed from the ground.

With reference to FIG. 4, it can also be understood that the tailgate 20 may include an extendable railing 101 to provide support for a person when using the ladder 22 in the deployed or lowered position. In one embodiment, this railing 101 includes one or more spaced, elongated handles, which in the illustrated embodiment take the form of first and second retractable supports or members 102, 104, one positioned on each side of the ladder 22. In the illustrated embodiment, these members 102, 104 are connected to and adapted for being withdrawn from the tailgate 20 in the active condition, and for returning to a retracted position within it in an inactive condition. As shown in FIG. 7, each member 102 (only one shown) may include an extendable portion 102a that telescopes into another member, such as a tubular receiver 102b, associated with and fixed to the tailgate 20.

Figure 8:
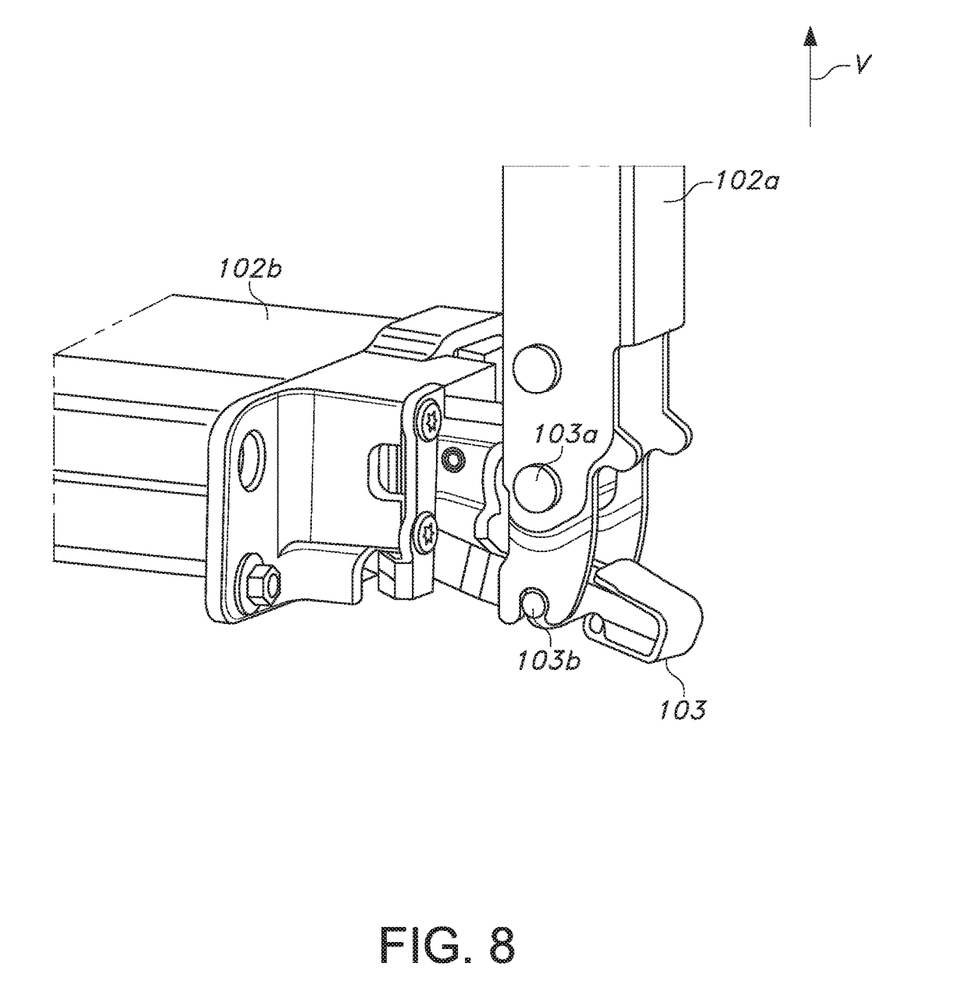
FIG. 8 illustrates a retractable handle pivoted to a vertical position.

As indicated in FIG. 8, the extendable portion 102a of the retractable member 102 may also be adapted for pivoting relative to the receiver 102b when fully extended so as to project in a generally vertical direction V. Specifically, the portion 102a may be connected to a support 103 connected to the receiver 102b by a pivot pin 103a, which allows for pivoting movement from a horizontal to a vertical orientation. A locking pin 103b may engage a notch in the extendable portion 102a to retain it in the vertical position once pivoted. As can be appreciated, a similar arrangement may be provided for the retractable member 104. Additional details of pivoting handles that may work in connection with this disclosure may be found in U.S. Pat. No. 9,302,719 and U.S. Patent Application Publication No. US20150336622, the disclosures of which are incorporated herein by reference.

According to one aspect of the disclosure, the ladder 22 and one or both of the retractable members 102, 104 (if two are present) may be combined to form a retractable bed extender 200 for use in combination with the existing vehicle bed 26. Specifically, with reference to FIG. 9, the extended portions 102a, 104a of retractable members 102, 104 forming railing 101 in the extended position may be pivoted upwardly to a vertical (which term for purposes of the disclosure includes a substantially vertical) orientation (note arrow V). Likewise, the ladder 22 may also be pivoted from the lowered position to a vertical position. As can be appreciated from FIG. 10, the transverse portion 54 of the ladder 22 may have a corresponding dimension, or width, equal to or greater than the spacing between members 102, 104. Consequently, the transverse portion 54 may engage the members 102, 104 when the two are in a similar vertical orientation, and thereby be supported.

Figure 10:
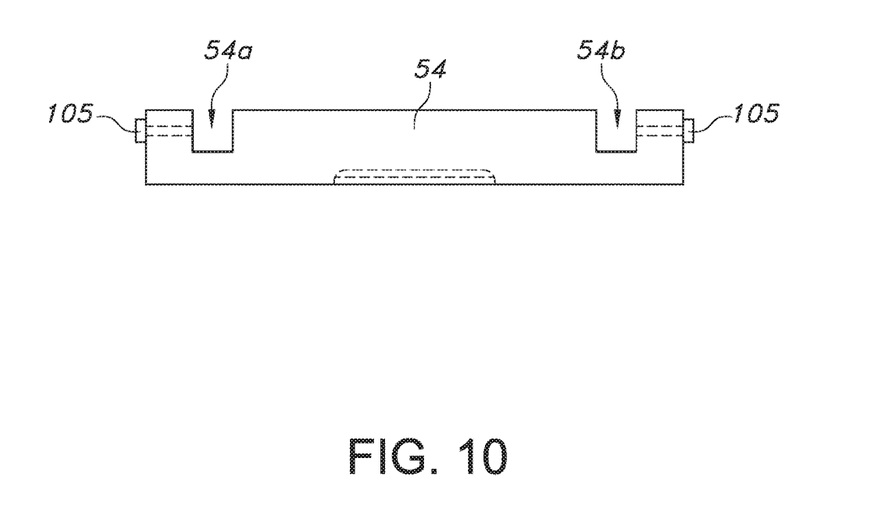
FIG. 10 is an end view of a transverse portion of a ladder forming part of the bed extender.

The ladder 22 may be adapted for releasably engaging the members 102, 104 in the extended position. Specifically, as shown in FIG. 10, the transverse portion 54 may include one or more receivers, such as openings or cutouts 54a, 54b for receiving the corresponding end portions of the members 102, 104. The transverse portion 54 may also include connectors, such as fixed or removable pins 105, for positioning in one or more openings in the members 102, 104 to form a secure, but releasable engagement when the bed extender 200 is vertically oriented. As should be appreciated, the arrangement may be reversed with the same result, with the connectors or pins 105 provided on the members 102, 104 for passing into the transverse portion 54.

Figure 9:
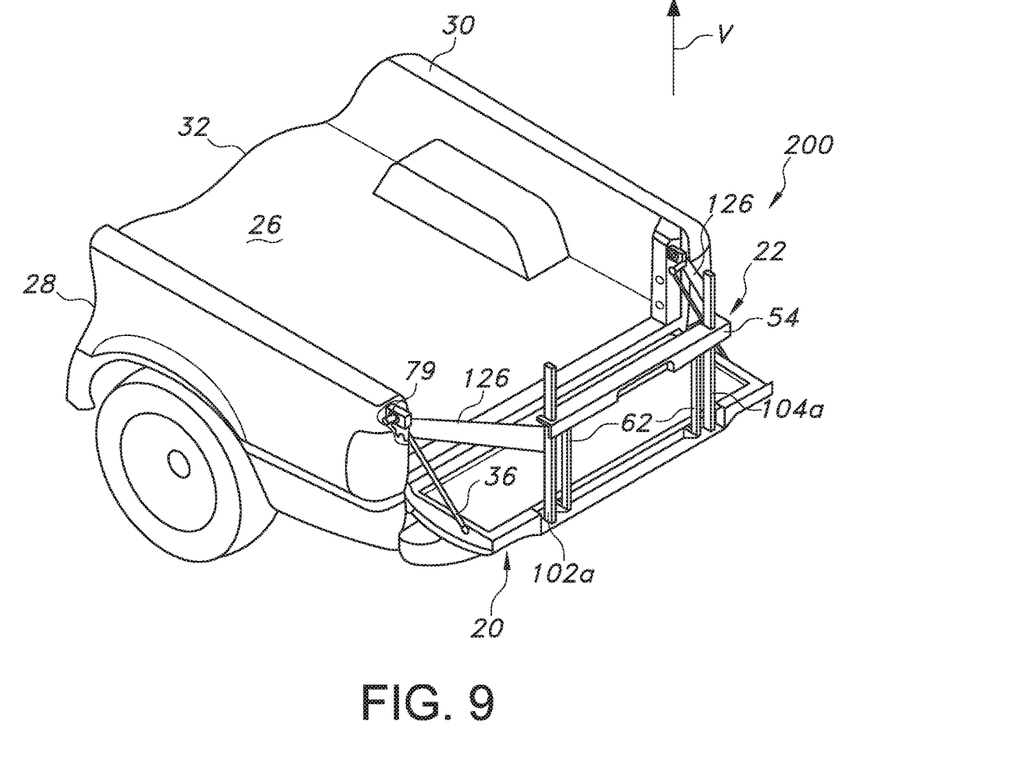
FIG. 9 is a partially cutaway perspective view of the vehicle bed taken from the rear, illustrating a retractable bed extender and associated webbing.

It should also be appreciated that the ladder 22 may be lowered from the raised configuration shown in FIG. 9 without altering the position of the extended portions 102a, 104a of members 102, 104. When left in this vertical orientation, the extended portions 102a, 104a may be used as handles for climbing into the bed 26 of the vehicle 24 when the ladder 22 is lowered.

The bed extender 200 when formed using the ladder 22 and the extended portions 102a, 104a of members 102, 104 may also be associated with auxiliary components for forming a connection with the panels 28, 30 of the vehicle 24. For example, as also shown in FIG. 9, a strap or webbing 126 may be extended between a support 79 attached to the vehicle 24 and one or both of the corresponding extended portions 102a, 104a of retractable member 102, 104 when vertically oriented. In the illustrated embodiment, a webbing 126 extends from each side panel 28, 30 to the corresponding portion 102a, 104a of the retractable member 102, 104, and may be connected at each end by a secure, but releasable connection (such as by way of a hook and clip, bayonet fitting, loop, Velcro fastener, or the like). While the webbing 126 is shown as being formed of a relatively narrow piece of flexible, durable material (such as nylon), it could be sufficiently wide to span from the upper extent of the panel(s) 28, 30 to the upper surface of the lowered tailgate 20, and may be solid or reticulated (see FIG. 14).

Figure 11:
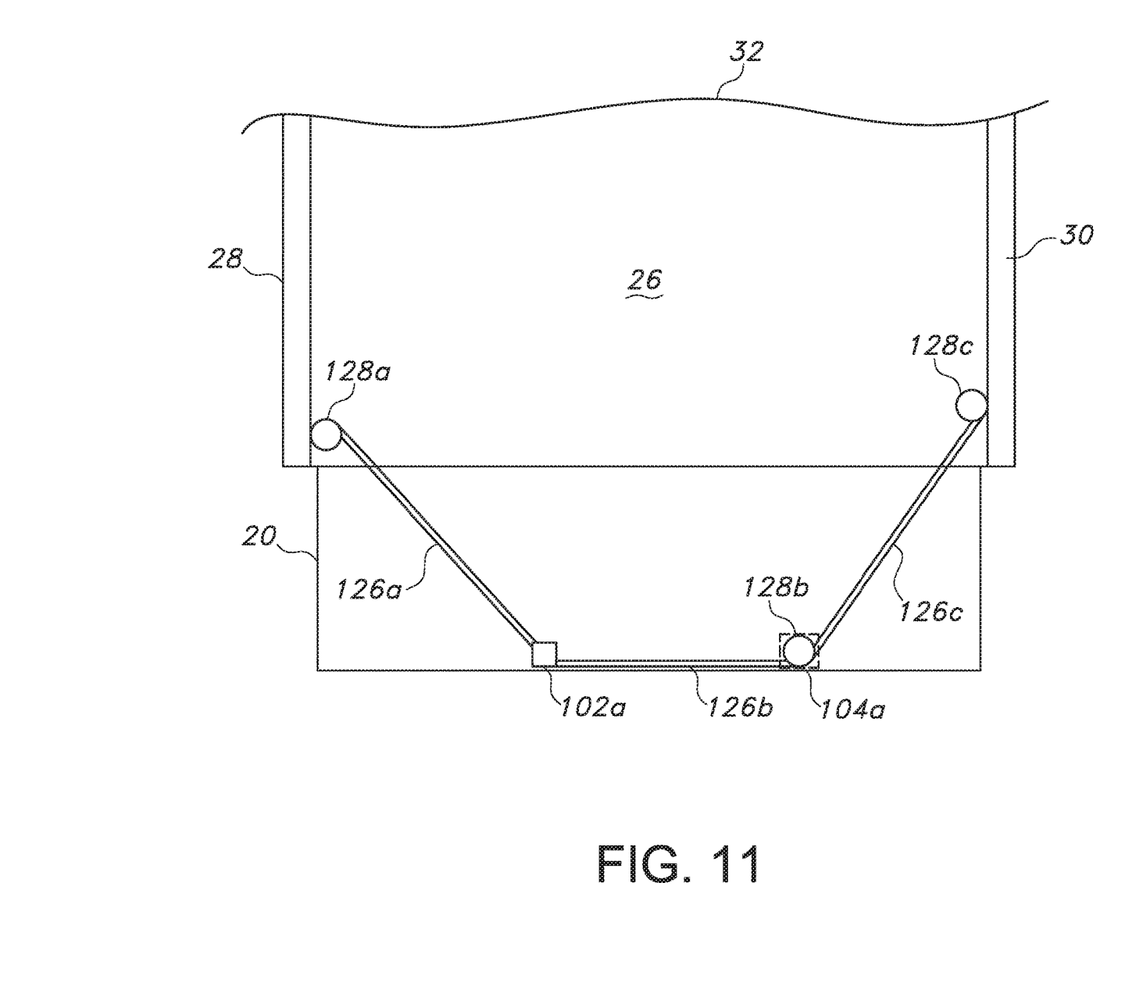
FIG. 11 is a schematic top view of one embodiment of a bed extender including a plurality of webbings.
Figure 12:
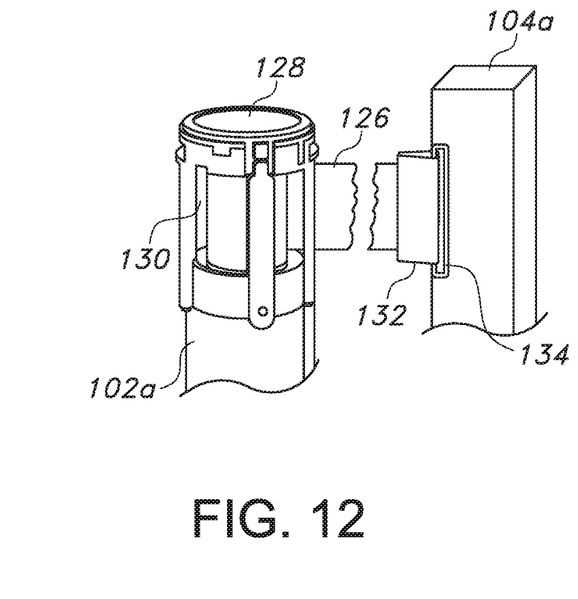
FIG. 12 is a perspective, partially cutaway view of a retractable webbing arrangement.
Figure 13:
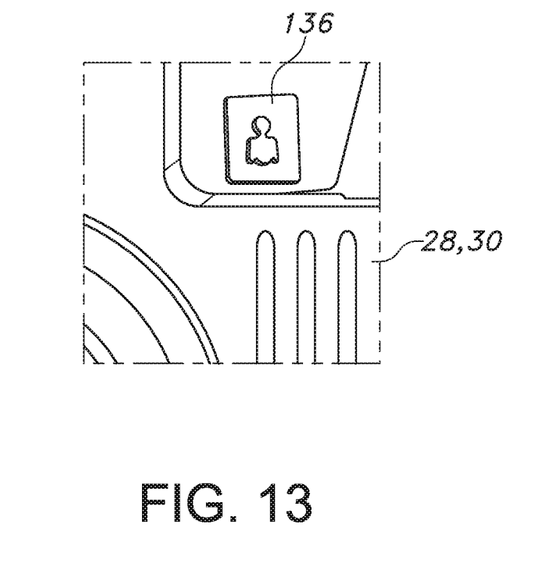
FIG. 13 illustrates a connector associated with the vehicle bed for connecting with the webbing or a housing therefor.

With reference to FIGS. 11-12, it can be appreciated that the webbing 126 may be retractable, such that it may be extended from a housing 128, which may include a spring-biased take-up spool (not shown) around which the webbing may wind when drawn into the housing. The housing 128 may include one or more openings 130 for allowing a free end of the webbing to pass in order to engage a remote structure, such as one of the upstanding portions 102a, 104a of the retractable members 102, 104. The free end of the webbing may also include a connector 132 for connecting with a mating connector 134, such as on the upstanding portion 104a in FIG. 12, and pivoting holders or holddown flaps (not shown) may also be provided for engaging the webbing. As illustrated in this figure, the housing 128 may also be connected to a support structure, such as the other upstanding portion 102a (so as to essentially form a part of it) and in a manner that does not inhibit retraction. However, the housing 128 may also be connected to one of the panels 28, 30 (such as using a connector 136 mounted to the panel 28, 30, as shown in FIG. 13, but also possibly as a recessed or internal structure), the tailgate 20, or another part of the vehicle 24. The connection may be by way of a secure arrangement, such as a bayonet fitting (e.g., a projection on the housing 128 with an oversized head for engaging a variable width slot in the connector 134) or conventional fasteners, such as bolts or screws.

The particular arrangement shown in FIG. 11 includes three separately retractable and extendable webbings 126a, 126b, 126c. Specifically, a first webbing 126a extends from a first housing 128a associated with a first panel 28, and is connected to the left side upstanding portion 102a. A second webbing 126b extends between the portions 102a, 104a such as from a second housing 128b associated with the second portion 104a (which would not be needed if ladder 22 were present, but the ladder is optional in this arrangement; however, if the ladder is present, it can be appreciated that only one of the retractable members 102, 104 might be provided to serve as a single handle for use in climbing the ladder when deployed). A third webbing 126c extends from the other or right side panel 30 to the right side portion 104a. In this manner, the webbings 126a, 126c, 126c help to retain cargo in the bed 26, but may simply be withdrawn or retracted into the associated housing 128a, 128b, 128c when the bed extension is not needed.

Figure 14:
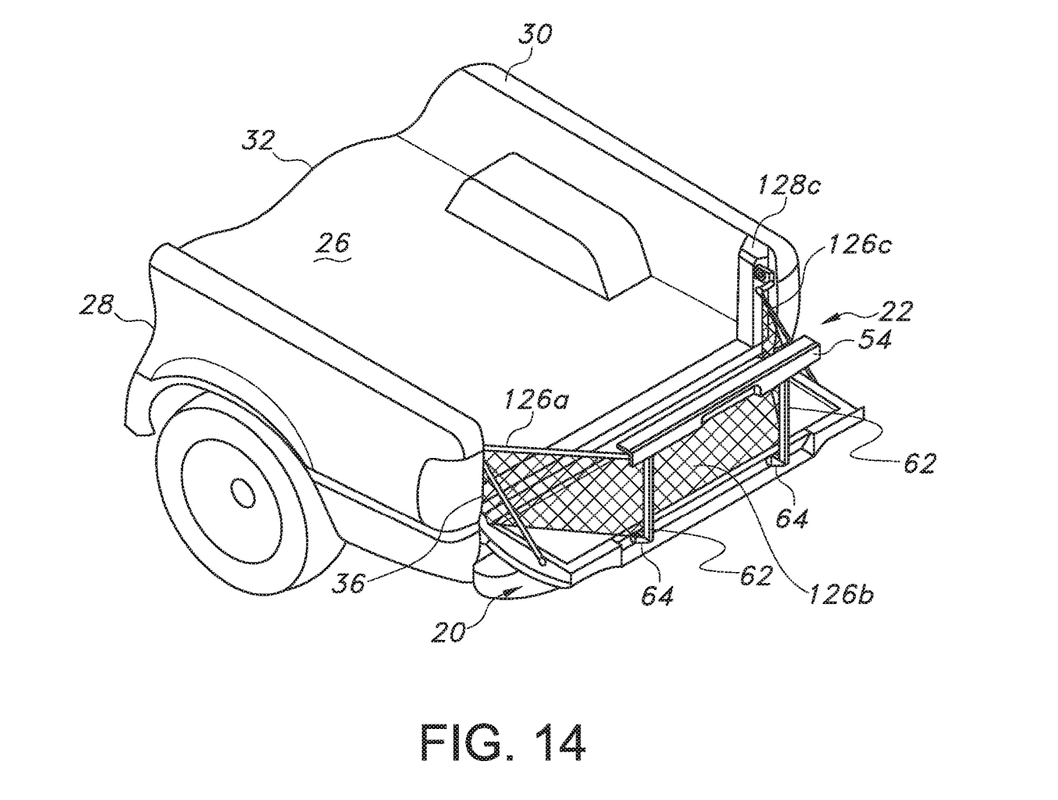
FIG. 14 illustrates a further embodiment of the extendable bed with a retractable webbing.

FIG. 14 illustrates an alternate embodiment in which the handles formed by members 102, 104 are omitted, and the ladder 22 forms the connection point for the webbings 126a, 126b, 126c, which are in the form of reticulated netting extending substantially the full height of the tailgate opening formed when the tailgate 20 is lowered. Any or all of the webbings 126a, 126b, 126c may be made retractable as noted above (see vertically elongated housing 128c for webbing 126c along the right side of FIG. 14, as a similar housing (not shown) may be provided for webbing 126a (or, it may be extended from a retracted position within support 62, as could be intermediate webbing 126b in the other support, but in a manner that does not interfere with the intended use of the ladder 22 and the ability to stow it within the tailgate 20 when not in use). In this arrangement, an intermediate webbing 126b may not be needed in view of the transverse portion 54 of the ladder 22.

As with moldings 50, 52, the transverse portion 54 of ladder 22 may be molded with the plastic being the desired final color so that it does not have to be painted. This transverse portion 54 may also include a pocketed handle 94 that provides for ease of gripping and pivoting the transverse portion 54 when deploying the ladder 22. The transverse portion 54 also may have an overall width that is just smaller than a gap 43 formed between the two tailgate moldings 50, 52, and a top surface flush with the corresponding surfaces of the tailgate moldings 50, 52.

Additionally, if so desired, the two tailgate moldings 50, 52 may include recessed flanges (not shown) that nest under the edges of the transverse portion 54. Accordingly, the transverse portion 54 of the ladder 22, when in its fully retracted position, blends in with the tailgate 20. Thus, the ladder 22 may be included without detracting from the esthetically pleasing look of the vehicle 24, and still allows the sliding of cargo into and out of the bed 26 over the top of a closed tailgate 20 without creating paint scratch concerns.

In summary, numerous benefits are provided by providing a retractable bed extender 200 for a vehicle 24 including a tailgate 20, such as a pick-up truck. The extender 200 may be formed from an existing ladder 22 in a generally vertical orientation with retractable members 102, 104, which may alternately serve as a railing 101 for aiding in using the step to enter the bed 26. A more secure and stable arrangement results, and one that does not require storage apart from the tailgate 20. A webbing 126 may also be provided to facilitate the selective use of the extender for securing cargo, with or without the use of the ladder 22 or the handle(s) formed by the retractable member(s) 102, 104.

While one embodiment of a ladder 22 is described above, further details of similar arrangements may be found in U.S. Pat. Nos. 6,918,624, 7,090,276, and 7,234,749, the disclosures of which are incorporated herein by reference. The disclosures of U.S. Pat. Nos. 7,488,021, and 7,267,387 are also incorporated herein by reference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for extending a vehicle bed, comprising:
   a tailgate for lowering to provide a tailgate opening for providing access to the vehicle bed, the tailgate including a retractable member adapted for extending vertically from the tailgate when lowered; and
   a retractable webbing for associating with the retractable member and adapted for moving to a deployed position extending inwardly from a wall of the vehicle bed to at least partially span the tailgate opening.

2. The apparatus of claim 1, wherein the retractable webbing comprises a first webbing adapted for spanning rearwardly from the wall of the vehicle bed to connect with the retractable member.

3. The apparatus of claim 1, wherein the tailgate comprises first and second retractable members for extending vertically from the tailgate when lowered, and wherein the retractable webbing is adapted for extending from the first retractable member to the second retractable members when oriented vertically from the tailgate.

4. The apparatus of claim 1, wherein the tailgate comprises first and second retractable members, and the retractable webbing comprises a first webbing for spanning between the wall and the first retractable member, and further including a second retractable webbing for spanning between the first and second retractable members.

5. The apparatus of claim 4, further including a third retractable webbing for spanning from the second retractable member to a second wall forming another portion of the vehicle bed.

6. The apparatus of claim 1, further including a housing supported by the retractable member for receiving the retractable webbing in a spooled configuration having a vertical axis about which the retractable webbing is spooled.

7. The apparatus of claim 1, wherein the retractable webbing includes a connector adapted for connecting with the retractable member.

8. The apparatus of claim 1, wherein the retractable member comprises a ladder supported by the tailgate and adapted for moving from a lowered position for use in stepping into the vehicle bed to a raised position.

9. The apparatus of claim 1, further including a ladder supported by the tailgate and adapted for moving from a lowered position for use in stepping into the vehicle bed while the retractable member serves as a handle for assisting in climbing the ladder.

10. The apparatus of claim 1, wherein the retractable webbing is positioned at least partially within the retractable member.

11. A vehicle including the apparatus of claim 1.

12. The vehicle of claim 1, wherein the wall of the vehicle bed includes a housing for the retractable webbing.

13. The vehicle of claim 12, further including a connector connected to the wall for connecting to the retractable web or the housing therefor.

14. An apparatus for extending a vehicle bed, comprising:
    a tailgate adapted for lowering relative to the vehicle bed to provide a tailgate opening, the tailgate including a first member adapted for extending vertically from the tailgate when lowered; and
    a first webbing extendable from a housing inwardly in a direction transverse to the vertically extending first member and adapted for spanning from a first wall of the vehicle bed to the first member.

15. The apparatus of claim 14, further including a second member adapted for extending vertically from the tailgate when lowered, and a second webbing for spanning transversely between the first and second vertically extending members.

16. The apparatus of claim 15, further including a third webbing associated with the second member to a second wall forming another portion of the vehicle bed.

17. The apparatus of claim 14, further including a ladder supported by the tailgate and adapted for moving from a lowered position for use in stepping into the vehicle bed to a raised position for connecting with the first member when oriented vertically from the tailgate.

18. A vehicle including the apparatus of claim 14.

19. An apparatus for extending a vehicle bed, comprising:
    a tailgate for lowering relative to the vehicle bed to form a tailgate opening;
    a ladder supported by the tailgate and adapted for moving to a lowered position for use in stepping into the vehicle bed;
    a retractable handle having a stowed position and a deployed position for use in climbing the ladder in the lowered position; and
    a webbing for associating with the retractable handle in the deployed position to at least partially span the tailgate opening.

20. The apparatus of claim 19, further including a housing for receiving at least a portion of the webbing in a spooled configuration.

* * * * *